United States Patent [19]
Voglesonger

[11] 3,710,160
[45] Jan. 9, 1973

[54] MOTOR BRUSH ASSEMBLY
[75] Inventor: Harry M. Voglesonger, Riverton, Conn.
[73] Assignee: Dynamics Coporation of America, New York, N.Y.
[22] Filed: Aug. 12, 1971
[21] Appl. No.: 171,150

[52] U.S. Cl. ................................................310/247
[51] Int. Cl. ............................................H02k 13/00
[58] Field of Search......310/239, 240, 242, 244-248, 310/229, 230

[56] References Cited

UNITED STATES PATENTS

| | | | |
|---|---|---|---|
| 3,513,343 | 5/1970 | Harvey | 310/247 |
| 3,534,206 | 10/1970 | Carey | 310/247 |
| 2,536,827 | 1/1951 | Thomas | 310/247 |
| 3,441,766 | 4/1969 | Amrein | 310/239 |
| 3,339,098 | 8/1967 | Burrows | 310/239 |
| 3,112,419 | 11/1963 | Dobslaw | 310/239 |

Primary Examiner—R. Skudy
Attorney—Watson D. Harbaugh et al.

[57] ABSTRACT

A brush holder assembly for an electric motor wherein during the useful life of the brush a spring wire clip bears against the brush through a slot in the brush housing to improve mechanical rigidity and electrical conductivity. When the brush wears to the extent that it no longer extends beneath the slot, the spring clip extends further down into the slot and obstructs the brush channel thereby preventing further extension of the brush compression spring and its eventual contact with the motor commutator.

9 Claims, 13 Drawing Figures

PATENTED JAN 9 1973
3,710,160
SHEET 1 OF 2
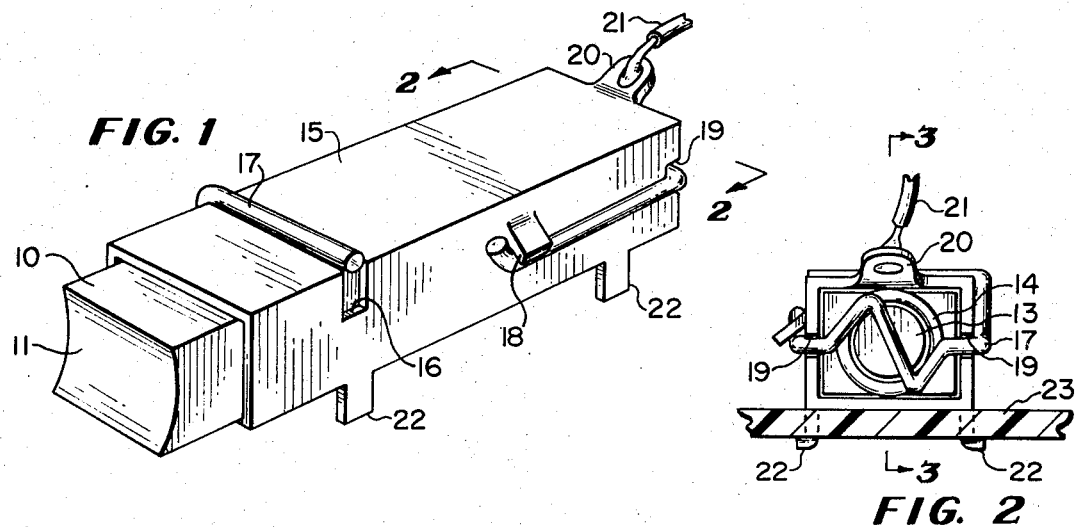
FIG. 1
FIG. 2
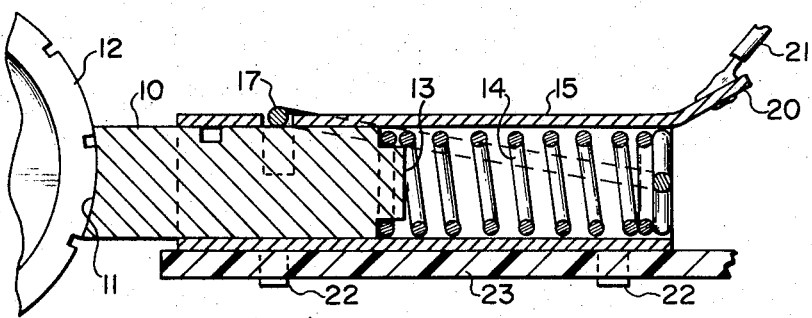
FIG. 3
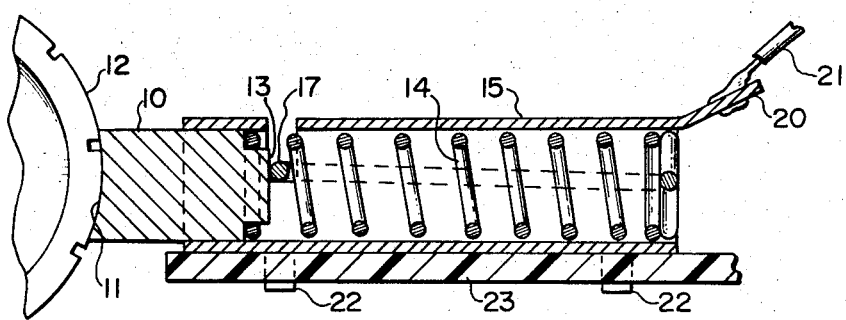
FIG. 4
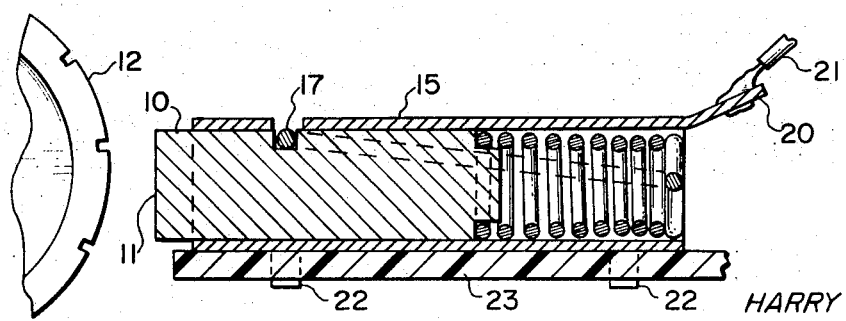
FIG. 5
INVENTOR:
HARRY VOGELSONGER
By Harbaugh & Thomas
Attorneys

PATENTED JAN 9 1973 3,710,160

INVENTOR:
HARRY VOGELSONGER
By Harbaugh & Thomas
Attorneys

MOTOR BRUSH ASSEMBLY

BACKGROUND OF THE INVENTION

This invention pertains to brush holder assemblies for use in electric motors and generators, and more particularly to an improved assembly which provides a better electrical and mechanical mounting for the brush and protects the commutator from undesirable contact with the brush compression spring after the brush has worn beyond its effective life.

Many types of electric motors require that their armature be supplied with electric current, and to this end may employ one or more stationary carbon brushes mounted on their frame or stator and disposed to bear against commutator segments or slip rings on the rotor. To insure proper alignment and good contact the brushes are generally slidably mounted in a housing and urged by a helical compression spring at one end of the housing against the commutator. One problem with this arrangement has been that when the carbon brushes wear away, the compression springs may come into contact with the commutator, possibly causing not only damage to the motor but also injury to persons nearby. Another problem, especially in low cost brush holder assemblies suitable for use in high-volume consumer products, is that as the brush wears the quality of its electrical contact with the brush housing diminishes, resulting in erratic or sluggish operation of the motor.

In the past manufacturers have gone to considerable expense to alleviate these problems. Generally, such efforts have required that either the brush have special grooves or protuberances to restrict its travel in the housing, or that some type of travel-limiting insert be provided between the brush and the compression spring. These efforts have undesirably added to the cost of the assembly by either requiring specially structured brush and spring assemblies, or by unnecessarily complicating the holder assembly.

A further problem encountered with motor brush assemblies has been lack of a provision for retracting the brush during assembly of the motor to facilitate insertion and removal of the motor armature. Heretofore this has been accomplished by placing a sleeve having a greater diameter than the commutator between the brushes, inserting the armature, and then removing the sleeve. During manufacture this is a time-consuming process, and in the field the proper sleeve may not be available.

Accordingly, it is a general object of the present invention to provide a new and improved electric brush mounting assembly for use in an electric motor.

It is a more specific object of the invention to provide an economical brush mounting assembly which prevents damage to the motor after the brush has worn beyond its effective life.

It is a still more specific object of the invention to provide a brush mounting assembly which prevents the brush compression spring from coming into contact with the motor commutator after the brush has worn beyond its effective life, and which provides a retracted position for the brush to facilitate assembly of the motor armature.

It is still another object of the invention to provide an improved and economical motor brush mounting assembly which offers improved mechanical rigidity and improved electrical conductivity, and which allows the brush and its compression spring to be replaced without demounting the brush housing from the motor.

The invention is directed to an electric brush assembly for an electric motor having an armature and an electric brush. The assembly comprises an elongated brush housing defining a channel for the brush, and spring means for urging the brush along the channel and into contact with the rotor. Means are provided in the assembly for obstructing the channel when the brush wears beyond a predetermined point to prevent the spring means from further urging the brush along the channel.

BRIEF DESCRIPTION OF THE DRAWINGS

The features of the present invention which are believed to be novel are set forth with particularity in the appended claims. The invention, together with further objects and advantages thereof, may be understood by reference to the following description taken in conjunction with the accompanying drawing, in the several figures of which like reference numerals identify like elements, and in which:

FIG. 1 is a perspective view of a brush assembly constructed in accordance with the invention;

FIG. 2 is an end view of the assembly of FIG. 1;

FIG. 3 is a cross-sectional side view taken along lines 3—3 of FIG. 2 and showing the position of the elements of the assembly after the brush has been partially worn;

FIG. 4 is a cross-sectional view also taken along lines 3—3 of FIG. 2 and showing the position of the elements after the brush has been completely worn;

FIG. 5 is a cross-sectional side view taken along lines 3—3 of FIG. 2 and showing the position of the elements while the brush is being held in a retracted position to facilitate insertion and removal of the armature;

DESCRIPTION OF THE PREFERRED EMBODIMENT

Figure 6:
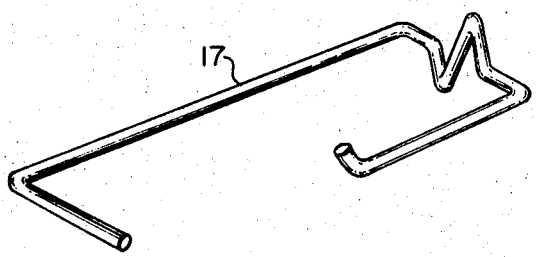
FIG. 6 is a perspective view of a spring wire retaining clip suitable for use with the assembly of FIG. 1.
Figure 7:
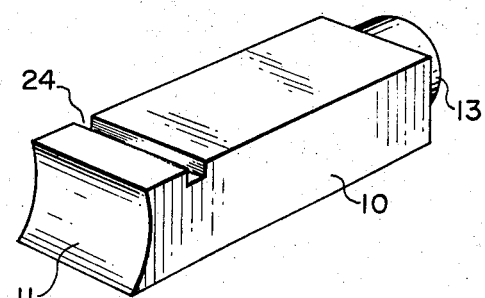
FIG. 7 is a perspective view of a brush suitable for use with the assembly of FIG. 1.

The brush holder assembly of the invention is shown in a form suitable for use with inexpensive fractional horsepower electric motors, such as might be used in consumer home appliances.

Referring to FIGS. 1–7, a carbon brush 10 of substantially rectangular cross-section has a concave face 11 adapted to engage a commutator 12, which comprises part of the rotatable armature of an electric motor. The other end face 13 of brush 10 may be flat or preferably may include an axial projection of reduced size providing a shoulder for engaging a helical compression spring 14. Compression spring 14 and brush 10, which preferably have approximately the same cross-sectional overall dimensions, are slidably contained in tandem within a brush housing 15, with the concave face 11 of brush 10 extending out the forward end of the housing towards the commutator. Housing 15 is mounted to the motor frame and forms a channel to maintain accurate alignment between the brush and the motor commutator.

A slot 16 is cut across the top and partly down the side faces of housing 15 to allow a brush retention spring wire clip 17 to bear down on brush 10. This retention clip is preferably adapted to extend along one side face, across the back end and along the other side face of housing 15 to a kick-up 18. A pair of notches 19 cut into the back edges of the two side faces, together with kick-up 18, serve to hold the clip in place. That portion of clip 17 which traverses the end of housing 15 is preferably sinuous so as to contact the rear most turn of the compression spring at more than two radially spaced points for effectively squaring the rear turn in supported relationship. An electrical terminal 20 formed by a tab on the top of housing 15 is connected to a lead 21 which carries current to the housing and hence to the brush. Two pair of mounting tabs 22 struck from the bottom of housing 15 provide convenient and economical means for securing the housing to an insulated brush mounting board 23 of the type often used in small appliance motors.

In operation, and prior to the brush being excessively worn, means comprising a compression spring 14 urge or bias brush 10 against commutator 12 to maintain a good electrical connection between these elements as the commutator rotates. During this time the wire brush retention clip 17 performs at least three functions. First, it bears down through slot 15 on the top of brush 10 to insure a snug fit for that element within housing 15, regardless of minor dimensional tolerance variations in the cross-sectional dimensions of the brush and channel defined by housing 15. Second, it improves the electrical contact between the brush and the housing by providing an additional electrical path between the two independent of those provided by the inner walls of the housing and the helical compression spring 14. Third, by preventing compression spring 14 from extending out the back end of housing 15, it forces that spring into compression and obviates the need for a separate end cap on the housing. The preferred sinuous form of this portion of the spring assures that the spring will be compressed in true axial alignment with the brush housing. Thus, the use of clip 17 results in not only an economy in manufacture, but also an economy in service since the brush and spring can readily be removed from the housing by merely unclipping the retention spring at knock-out 17, without demounting housing 15 or otherwise disturbing its alignment relative to the commutator.

As brush 10 wears, compression spring 14 maintains contact between the brush and commutator 12, and in so doing causes the brush to slide along the channel formed by housing 15 towards the commutator. Eventually brush 10 passes beyond slot 16, and the brush retention clip 17 no longer bears down on the brush. At this point retention clip 17 extends deeper into slot 16 and between adjacent turns of spring 14, thus effectively reducing the diameter of the channel to less than that required by the spring and thereby preventing that element from expanding further and eventually coming into contact with the commutator.

The brush holder assembly may also incorporate provisions for retaining the brush in a retracted position. This is accomplished without additional parts by means of a groove 24 cut across the top of brush 10 at a predetermined location such that when the brush is pushed back into housing 15 and the groove lies beneath slot 16, clip 17 falls into the groove and prevents compression spring 14 from further extending the brush. Groove 24 must be deep enough to receive clip 17, but not so deep as to unduly weaken brush 10 mechanically or electrically.

Figure 8:
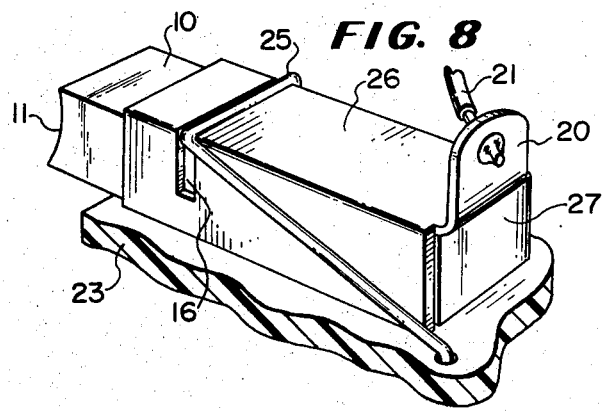
FIG. 8 is a perspective view of an alternate embodiment of the invention employing a retaining clip of a different construction.

It is contemplated that other clip constructions besides that shown in FIGS. 1–7 are possible. For instance, in FIG. 8 another construction is shown wherein instead of passing across the rear face of the brush holder, the clip wire 25 passes through the nonconductive brush-assembly mounting board 23 of the motor and in so doing helps to secure the entire brush holder assembly to the mounting board. The other elements of the assembly may be identical with those of the previously described embodiment, except for housing 26 which must include an end cap 27.

Figure 9:
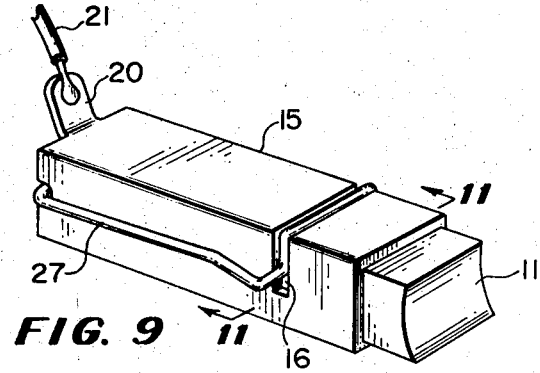
FIG. 9 is a perspective view of another alternate embodiment of the invention wherein the retaining clip is adapted to cooperate with a corner notch on the brush to hold the brush in a retracted position.
Figure 10:
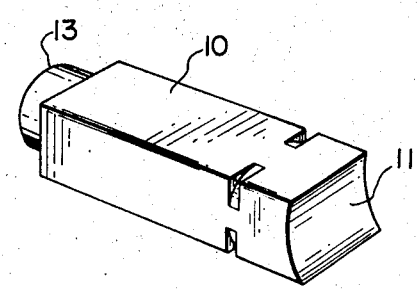
FIG. 10 is a perspective view of a brush suitable for use with the assembly of FIG. 9.

Another possible clip construction is shown in the brush holder assembly of FIGS. 9–13 which, with the possible exception of the clip and notch 24, may be identical to the assembly described in FIGS. 1–7. In this assembly a clip 27 is biased inwardly as well as downwardly against the brush to eliminate the need for the retention notch to extend completely across the top of the brush. Instead, it is contemplated that the notch would instead appear only at each corner of the brush and would be cut into the brush with the same lathe operation used to turn the axial abutment 13 on the rear face of the brush. Referring to FIG. 9, the spring wire clip 27 is seen to include a dogleg bend at the point where it first bears against the brush. This construction permits it to extend inward whenever one of the corner notches falls beneath notch 16, and downward whenever the brush is expended to the point where it no longer lies beneath the slot. In either event the clip functions like its counterpart 17 in that it restrains the brush in its expended and retracted conditions.

Figure 11:
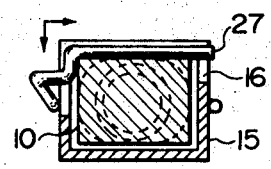
FIG. 11 is a cross-sectional view taken along lines 11—11 of FIG. 9 and showing the position of the elements when the brush has been partially worn.
Figure 12:
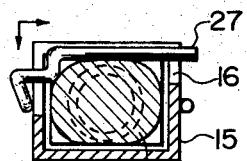
FIG. 12 is a cross-sectional view taken along lines 11—11 of FIG. 9 and showing the position of the elements while the brush is being held in a retracted position.
Figure 13:
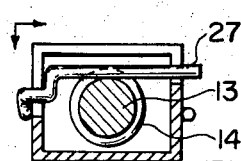
FIG. 13 is a cross-sectional view taken along lines 11—11 of FIG. 9 and showing the position of the elements after the brush has been completely worn.

This action may be seen better in FIGS. 11–13. FIG. 11 shows the brush during normal use wherein clip 27 cannot move either inwardly or downwardly, and functions only to improve the electrical and mechanical mounting of the brush. In FIG. 12 the brush has been pushed back into the housing for retraction and the corner notch is seen to allow clip 27 to move inwardly and effectively trap the brush. In FIG. 13 the brush has been expended and has worn down beyond slot 16, allowing clip 27 to extend downwardly into slot 16 and trap the helical compression spring 14.

While the brush and housing in the illustrated embodiments are of rectangular cross-section, it will be appreciated that the invention can be practiced with elements of other shapes and sizes, such as a cylindrical brush and housing assembly.

Thus, a brush holder assembly for an electric motor has been shown which offers not only improved mechanical and electrical performance during the effective life of the brush, but also serves to protect the motor from damage after the brush has been expended. Moreover, the assembly permits easy removal and replacement of the brush or compression spring without demounting the assembly or otherwise changing its alignment.

While particular embodiments of the invention have been shown and described, it will be obvious to those skilled in the art that changes and modifications may be made without departing from the invention in its broader aspects, and, therefore, the aim of the appended claims is to cover all such changes and modifications as fall within the true spirit and scope of the invention.

I claim:

1. A brush assembly for an electric motor having a commutator and a stator and comprising:
   an elongated brush housing having an elongated slot extending at least partially about its periphery at a predetermined location substantially transverse to its axis;
   an elongated carbon brush slidably mounted within said housing and adapted to extend beneath and obstruct said slot only during its effective life;
   means comprising a compression spring for urging said brush outwardly through one end of said housing and against said commutator;
   and means comprising a clip member disposed within said slot to bear against said brush during its useful life, and to extend deeper into said slot and restrict the longitudinal travel of said compression spring after termination of the useful life of said brush;
   said brush and housing being of substantially rectangular cross-section with said slot comprising a mid-portion extending across one side face of said housing and end portions extending part way across the side faces contiguous to said one side face.

2. A brush assembly as described in claim 1, wherein clip member is a spring wire clip adapted to extend across the other end of said housing to prevent said compression spring from extending therethrough.

3. A brush assembly for an electric motor having a commutator, a stator and an electric brush for establishing electrical continuity therebetween, comprising
   an elongated brush housing defining a channel for said brush including a transverse deep slot through at least one side thereof,
   spring means for urging said brush along said channel past said slot and through one end of said housing into contact with said commutator, and
   means including a clip member reciprocable in said slot and urged to bear slidably upon the wall of said brush as the brush wears at its commutator contacting end,
   said slot being substantially deeper than the wall of the brush in a cross-sectional direction for said clip member to move a substantial distance deeper in said slot to interlock with and arrest said spring means and its action when said brush wears a predetermined amount and clears contact with said clip member.

4. A brush assembly as described in claim 3 wherein said clip member comprises a spring wire clip.

5. A brush assembly as described in claim 3 wherein said spring means comprise a helical compression spring and said clip member extends through said slot and between adjacent coils of said spring to prevent further urging of said brush after said brush has worn beyond said predetermined point.

6. A brush assembly as described in claim 3, wherein said brush and said housing are of substantially rectangular cross-section and wherein said slot comprises a first portion extending part way across a side face of said housing, a second portion extending across the top of said housing, and a third portion extending part way across the other side face of said housing.

7. A brush assembly as described in claim 6, wherein said third portion is complementary to said first portion and the plane of said slot is perpendicular to the longitudinal axis of said brush housing.

8. A brush assembly as described in claim 3, wherein said brush has a groove cut across at least partially about its periphery at a predetermined location, such that said groove lies beneath said slot and receives said clip when said brush is moved to a retracted position.

9. A brush assembly as described in claim 3, wherein said spring wire clip member is adapted to extend across the other end of said housing to prevent said compression spring from extending therethrough.

* * * * *